United States Patent

[11] 3,572,611

| [72] | Inventor | Robert F. Oulton<br>Annapolis, Md (1512 Suncrist St.,<br>Midland, Mich. 48640) |
|---|---|---|
| [21] | Appl. No. | 778,175 |
| [22] | Filed | Nov. 22, 1968 |
| [45] | Patented | Mar. 30, 1971 |

[54] SEA-GOING VESSELS WITH SEPARABLE MODULES
40 Claims, 10 Drawing Figs.

[52] U.S. Cl. .................................................. 244/2, 114/43.5
[51] Int. Cl. ...................................................... B64c 37/02
[50] Field of Search........................................... 244/2, 116, 12, 13, 101; 114/43.5

[56] References Cited
UNITED STATES PATENTS

| 1,681,434 | 8/1928 | Richardson | 114/238(X) |
| 1,801,039 | 4/1931 | Florig et al | 244/2 |
| 1,833,033 | 11/1931 | Ortega | 244/2(X) |
| 2,401,853 | 6/1946 | Bailey | 114/20(X) |
| 2,421,699 | 6/1947 | Johnson | 244/135 |
| 2,444,332 | 6/1948 | Briggs et al. | 244/49 |
| 2,591,913 | 4/1952 | Bowers et al. | 244/135 |
| 2,780,422 | 2/1957 | Maglio, Jr. | 244/2 |
| 2,951,664 | 9/1960 | Smith | 244/135 |
| 3,011,738 | 12/1961 | Skramstad et al. | 114/20(X) |
| 3,295,789 | 1/1967 | Hill | 244/2(X) |

OTHER REFERENCES
Aero Digest, Strategic Bombing and Strategic Thinking, Dec. 1949, Page 62.

Primary Examiner—Milton Buchler
Assistant Examiner—Carl A. Rutledge
Attorneys—Edwin M. Thomas, Ralph L. Thomas and Thomas and Thomas ABSTRACT: A seagoing vessel, such as an aircraft carrier, is made up of separable modules, some of which can fly, and/or submerse, individually, and can be quickly joined together to fly or to submerge collectively, and to provide a large aircraft-supporting surface. This minimizes the target for enemy attack. The complete vessel can be quickly disassembled to permit interchanging units or provide for quick turn around in port.

Patented March 30, 1971

INVENTOR
ROBERT F. OULTON

BY Thomas & Thomas
ATTORNEYS

Patented March 30, 1971 3,572,611
3 Sheets-Sheet 2
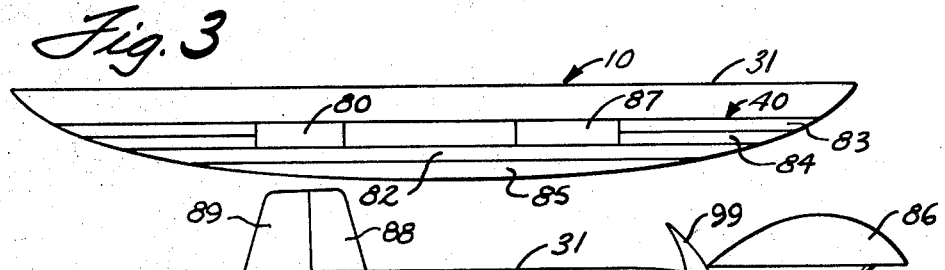
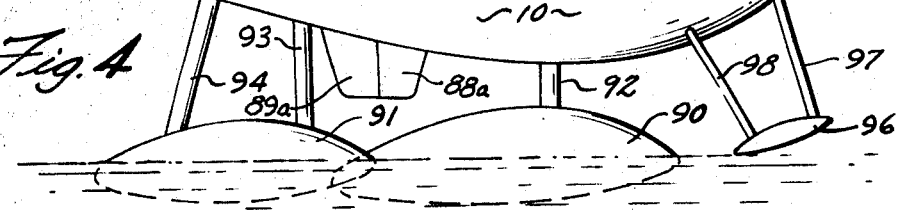
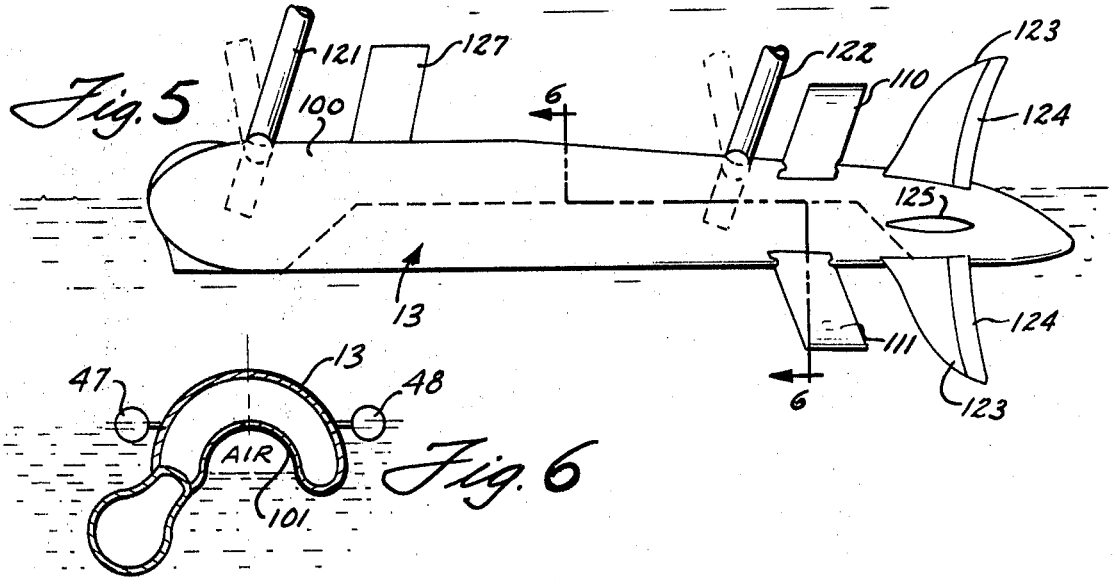
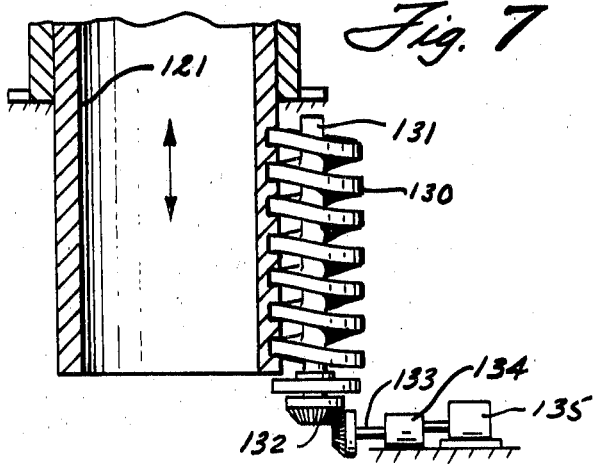

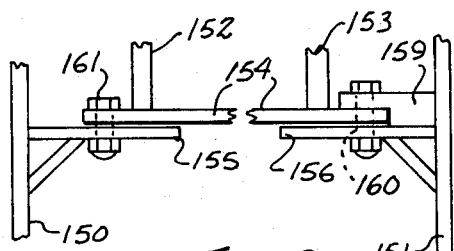
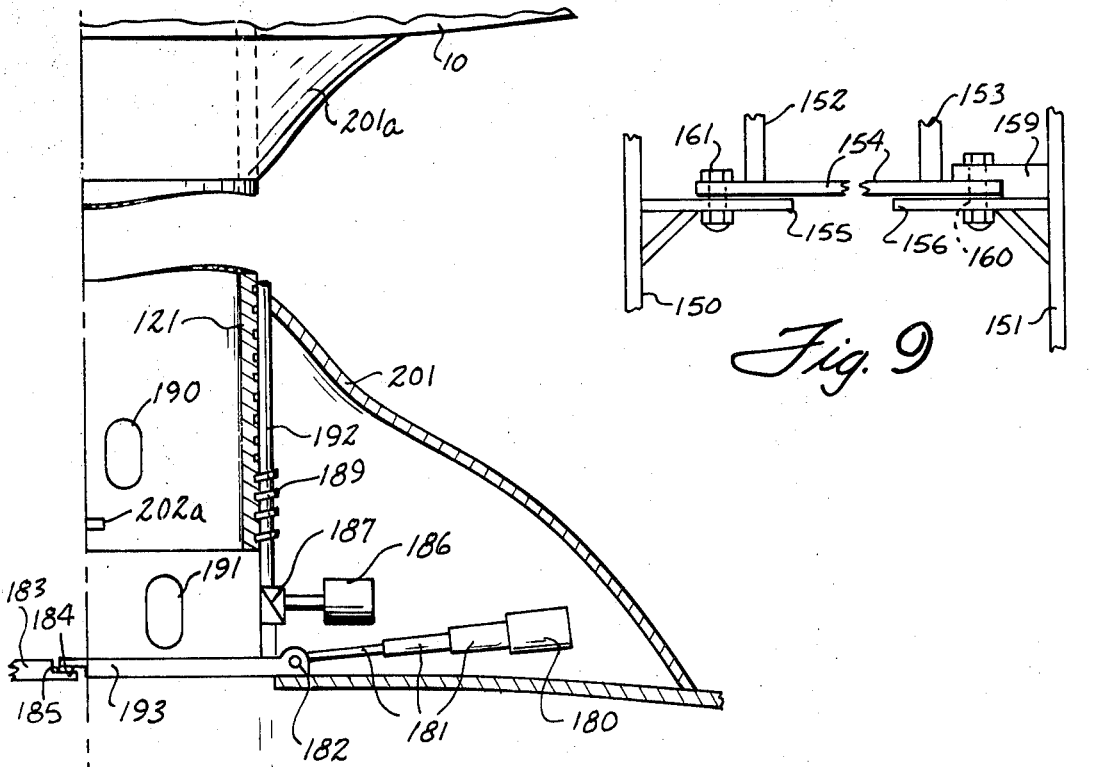
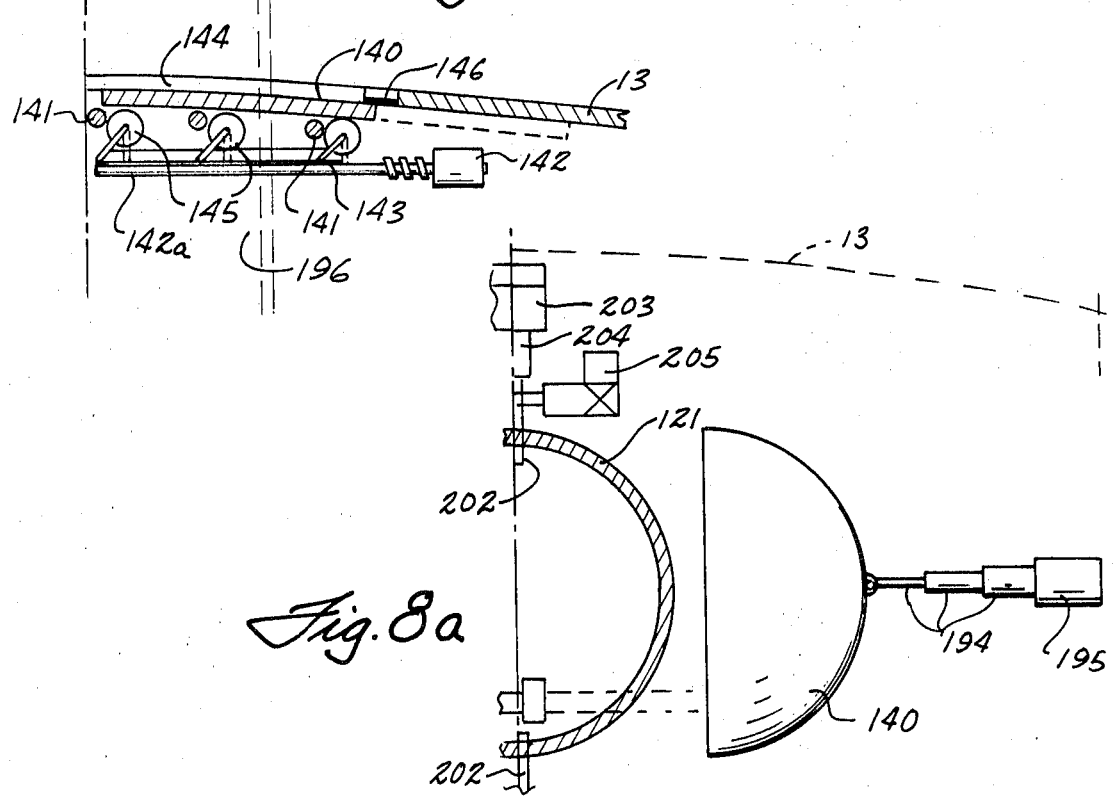

SEA-GOING VESSELS WITH SEPARABLE MODULES

BACKGROUND AND PRIOR ART

Modern aircraft carriers are limited to surface operation at sea. They are relatively slow in speed, largely because of the deep draft of their hulls. In this respect they are generally similar in configuration to seagoing vessels built during many past centuries.

Because of their design, and particularly because of their deep draft, it is not practicable to use the most modern power plants in aircraft carriers of conventional type. Thus atomic power plants, used with great success in submarines, cannot drive the underwater bulk of huge vessels much faster than earlier power plants, so are not particularly advantageous in this respect for such conventional carriers. Moreover, such vessels present attractive undersea targets, e.g. for submarine torpedoes, because of their large bulk below the water line. The problem is so serious that conventional carriers and other large seagoing vessels of deep draft and relatively slow speed are likely to become obsolete. They are too susceptible to damage from the newer high-speed and heavily armed submarine craft, aircraft and very high-speed surface vessels capitalizing on such slow speed.

It has been suggested previously that aircraft carriers might be made submersible. Such vessels, it has been said, can carry a flight deck on struts and submerge the main vessel, at least, in times of danger of attack. It appears to be preferable, however, to have modules or components which can fly and thus assemble or separate at much greater speeds and/or more quickly. A particular object of the present invention is to design a carrier, or other vessel, having modules or components capable of individual flight yet quickly and firmly connectable to one or more seagoing components to provide a carrier surface, landing surface for smaller aircraft, or the like.

Another object is to design components which not only are capable of individual movement by flight and by other methods but are capable of other uses. Still another object is to design modules or components better suited to new and future types of power plants which are becoming available. At the same time, these components or modules are designed to be capable of being so assembled as to present relatively shallow profiles or targets below the surface of the water.

Further objects are to design the individual components, and the whole assembly as well, to that the modules which are submersible may be brought to or even above the water surface when needed. Structural requirements for the high travel speeds of the future, such as superior water tightness and air tightness, are compatible with requirements for withstanding pressures at submarine depths. Since such structure, though expensive, is necessary, the present invention makes more versatile use of it.

By appropriate design, it is possible to make up the modules or components so that they can be combined or assembled in different ways, to make different types of vessels. To facilitate such assembly, power-operated extensible shafts are provided in the large modules for securing the smaller ones to them. Power-operated hatches and locking means to hold the modules or components together also are utilized.

BRIEF DESCRIPTION OF DRAWINGS

FIG. 3 shows a sectional view taken on the line 3—3 in FIG. 1.

FIG. 4 shows a side view of the flying module in FIG. 1 on pontoons and with the submersible modules removed.

FIG. 5 shows a side view of a submersible module capable of separate service as a submarine.

FIG. 6 is a sectional view of the submersible module taken substantially on line 6—6 of FIG. 5.

FIG. 7 shows, in larger scale, a means for extending or withdrawing a major shaft element.

FIG. 8 is a diagrammatic centerline view, partly in section, showing a shaft for connecting a wing and a submersible.

FIG. 8a is a plan view showing the shaft, partly in section, and its assembly as seen with the skin of the submersible removed.

FIG. 9 is an elevation view of a locking arrangement for securing modules within the wing itself.

DESCRIPTION OF PREFERRED EMBODIMENT

The following description will be given primarily with respect to an aircraft carrier and modules or components therefor, although it will be understood that the invention is not necessarily limited thereto.

Figure 1:
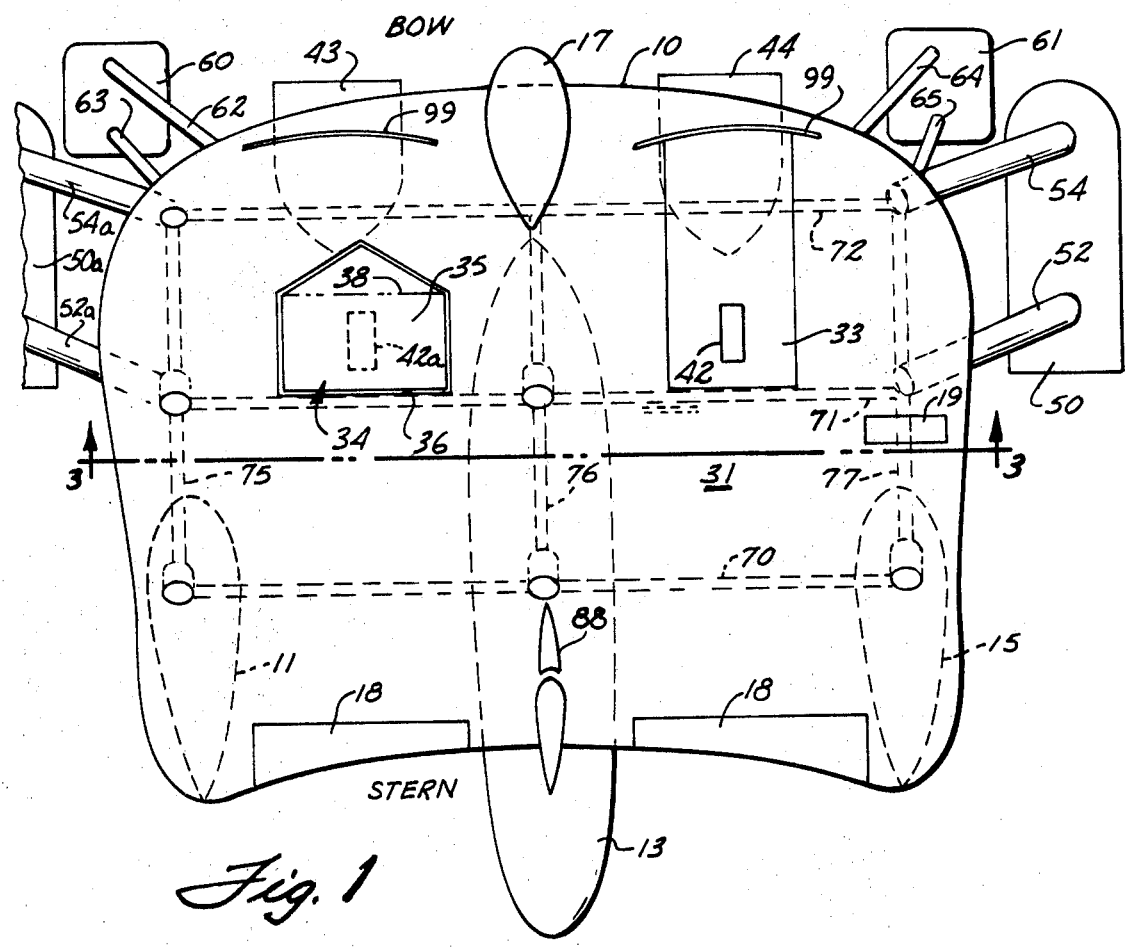
FIG. 1 shows a plan view of a craft comprising a flying member to which are attached several separable modules and components.
Figure 2:
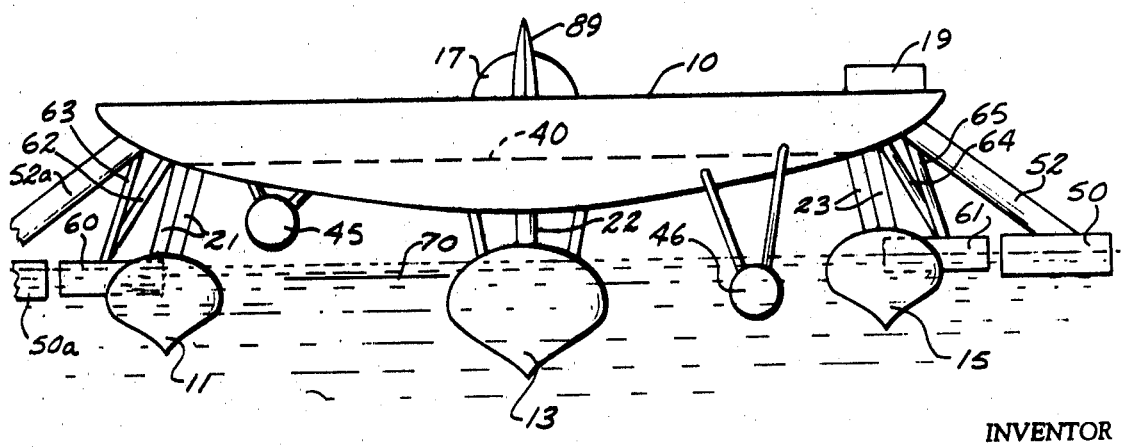
FIG. 2 is an elevation view of FIG. 1 from the stern.

FIGS. 1 and 2 show plan and elevation views, respectively, of a carrier which is made up by assembling a flying "wing" member 10 and floating and submersible components 11, 13, 15. Each of the water borne components has extensible upwardly projecting shafts 21, 22, 23 to which other module elements are to be attached. The various components or modules just mentioned will be described in further detail below.

A large area vehicle or module having an upper surface suitable for takeoff and landing of aircraft and capable of flight in air, referred to as the wing, is indicated at 10 as being supported on the upwardly projecting shafts 21, 22 and 23 which can be projected upwardly, respectively, from the various module vessels 11, 13 and 15. The wing 10 preferably has a substantially smooth and uninterrupted upper surface 31 of sufficient area for receiving and sending off fighter aircraft and similar equipment, or helicopters and the like. The deck surface 31 is provided with necessary hatch openings and navigation controls but otherwise is substantially free of interruptions or impediments. It may have several large openings 33, 34 which may be covered by hinged or sliding covers. Only opening 34 is shown with a cover 35. For example, the sliding covers may be movable in guideways such as 36 to blend into the desired large smooth landing surface. When the openings on the top deck are open, they may accommodate one or more elevators 38 large enough to be used to lift aircraft and other equipment from a lower storage compartment 40 to the deck surface. See FIG. 3 for a diagram or transverse section of the stowage compartments. The covers are used to cover the opening when the elevators are retracted to a position below the upper surface of the wing 10. Some of these will be described further hereinafter.

Ordinarily the wing 10 does not carry airplanes on the upper surface 31 while the wing 10 is in flight. The wing 10, however, is adapted to receive aircraft and to send them off while the wing 10 is in flight. For launching purposes a catapult 42, with an aircraft attached, is elevated to the upper surface 31 of the wing, and the attached aircraft is launched horizontally across the upper surface 31. A catapult 42a, with an aircraft attached and disposed vertically, is used to catapult an aircraft vertically. The launch takes place with the catapult 42a disposed in a retracted position below the upper surface 31 with the sliding cover 35 retracted, whereby the large opening 34 is open. Thus the aircraft is launched vertically from below the upper surface and passes out of the wing through the opening 34. An aircraft may be catapulted from the wing 10 additionally by a catapult, not shown, disposed in a lower deck compartment 80 in FIG. 3 which compartment is open through to the bow. This permits the aircraft to be launched horizontally from beneath the upper surface 31.

This craft has usual propeller means 43, 44 and may include auxiliary propellers, such as an air propeller 45, shown at the left of FIG. 2, and a water propeller 46 shown at the right. Other thrust devices, such as jet engines, jet props, etc., obviously may be used. For this reason, it will be understood that the term "propeller" is used in the generic sense, unless otherwise indicated. Thus, the wing 10 itself is capable of propelling itself whether airborne or waterborne. It may be equipped with conventional pontoons or equivalent buoyancy devices, etc., not shown in these FIGS., so that it can land or take off from the surface of the water. These buoyancy devices may be used further to decrease the draft of the craft in FIG. 2 at slow speeds or while stopped in the water. The buoyancy devices may be attached to the wing itself or to any of the other modules.

The extensible shafts 21, 22 and 23 may be telescopic or multitelescopic and when not in use they are withdrawn into the respective vessels 11, 13, 15, etc., The number of such shafts will vary, depending on the design of the equipment and the number of submersible components. A large vessel such as 13 will have at least two or more. Auxiliary floating units may also include fuel vessels 50 and 50a attached by shafts 52, 52a and 54, 54a to the wing 10. Additional modules or auxiliaries, such as tender units 60, 61 may also be attached by extensible shafts 62, 63, 64 and 65, as indicated in FIG. 1. These are useful to jockey the respective components into position while assembling or to hold them while disengaging the submersible vessels, for example, from the wing 10.

It will be understood that, in general, the submersible vessels or modules may be designed to run on the surface, as well as below the surface, of the water. When the main vessel is to be assembled by bringing the various modules together, the submersible vessels rise up under the wing and project their shafts up to connecting positions with the wing 10. These parts are locked together and then can travel or float as a unit.

Lateral framework elements 70, 71 and 72, when not in use, preferably are telescoped within the water borne vessels 11, 13, 15, etc., as are the longitudinally projecting frame components 75, 76, 77. The manner in which typical ones of these components are projected and controlled will be discussed more fully hereinafter.

FIG. 3, as already mentioned, shows diagrammatically a transverse section of the wing 10 with its broad deck 31, aircraft stowage compartments or hangar deck 40, and several auxiliary compartments including miscellaneous storage 82, 83, 84, living quarters 85, etc. It will be understood that any of these compartments may be used for fuel, ammunition, food, and various stowage purposes. Appropriate compartments may be filled with water when the craft is connected with the submersible vessels, if required, to give ballast and stability to the assembly. See also FIGS. 1 and 4. Fins 88, 88a, rudders 89, 89a, elevators 18, and dual aileron-spoilers 19 are provided for stabilizing and navigating the wing. They are useful when the wing 10 is airborne, waterborne, or submerged. Suitable pumps for bringing in or discharging water from the sea are provided, as will be obvious. Compartments 80 and 87 typically may be used for either aircraft catapults or for cargo loading or unloading through the bow, as shown. Such compartments may be oriented to permit such operations through the sides or stern of the wing 10.

FIG. 4 shows a side view of the flying unit 10 with pontoons 90, 91 provided for supporting it on the surface. Housing 86 encloses vessel control stations. Retractable air barrier 99 controls air flow over landing and elevator surfaces.

It will be understood that the pontoons 90, 91 may be separated from the aircraft when it is associated with the submersible modules to form a unit structure such as an aircraft carrier. However, the pontoons 90 and 91 may be secured permanently to the craft 10 by means of struts or shafts 92, 93, 94, etc.

A pilot pontoon 96, supported by shafts or struts 97, 98, is shown at the front. In this case the propulsion means are not shown, but it will be understood that they are of any suitable conventional type, such as jet engines.

Referring to FIG. 5, the main submersible module 13 is shown in greater detail. It comprises a hull 100, preferably of the "trapped bubble" type. It has a concave undersurface, indicated at 101 in FIG. 6. This configuration is particularly suitable for various types of surface vessels, but it can be used also in connection with submersibles. The vessel 13 has been described above as being submersible. That is, it can serve as a submarine in its own right, carrying the usual submarine-type weapons, a high-speed power plant using atomic energy, for example, and incorporating the latest improvements in subsurface vessels. By reason of its transverse section, which entraps air, the buoyancy of the vessel is increased so that its draft is decreased in spite of the large loads superimposed by the wing 10 and the planes which it may be carrying at times. As shown in FIG. 6, buoyant outrigger stabilizers 47, 48 can be used when vessel 13 is at rest or while it is being connected to a wing 10, etc.

The arrangement of the vessel 13 in FIG. 5 is such that the draft is much shallower than that of conventional vessels. Such a vessel rides high in the water so that torpedoes launched from enemy craft tend to pass under the vessel without damage. This vessel has suitable propulsion means, indicated generally at 110 and 111, the latter being of the water propulsion type. Extensible shafts 121 and 122 are shown which can be drawn into the vessel or projected above it to substantial distances when it is desired to attach the airborne module 10, etc. Stabilizing fins 123 and rudders 124 are provided, as well as the usual horizontal fins or controls 125. Control tower or shaft 127 may include a periscope and other conventional equipment used on submarines.

FIG. 7 shows, in enlarged detail, a mechanism for raising and lowering the telescoping shafts 121, 122 or the shafts 21, 22 and 23 previously mentioned. It comprises a hilical screw 130 secured to a rotatable shaft 131 driven through bevel gearing 132 by the output shaft 133 of a speed-reducing unit 134. The latter is power-driven by a suitable motor 135. The motor 135, of course, is reversible so that the screw 130 can be used to raise or lower the shafts, holding them firmly in locked position at whatever elevation they may project. It will be understood that any of the shafts, such as 121 shown in FIG. 7, or 122 in FIG. 5, can be of the multiple concentric telescoping type with appropriate drive gear to raise and lower the several components. In this manner, a shaft extensible to a considerable length can be housed in a relatively small space. The same principle is applied to the laterally and longitudinally projecting shafts or frame elements 70, 71, 72, 75, 76 and 77, already mentioned. It applies also to shafts 52 and 54 which can be stowed in the fueling vessel 50, if desired, or can be projected thereto from either the hovering wing 10 or the surface vessels, or any suitable one of these components or modules. In some cases, the shafts may be projected from both, or some from one and some from another.

The craft illustrated in FIGS. 1 and 2 must be of the type which is completely seaworthy and airworthy. For this reason, hatches and doors in the wing 10 and the submersibles 11, 13 and 15, for example, are at all times adequately closed and sealed. Likewise, the connecting shafts must be adequately sealed also. It is necessary that the shafts, hatches and doors be sealed in flight to protect personnel within, and adequate sealing is essential when submerged in order to make the craft seaworthy as well as protect the personnel within.

Next, the shaft arrangement for connecting the wing and submersibles is discussed. For this purpose reference is made to FIG. 8 where the upper half of FIG. 8 shows the lower end of a shaft 121 projecting below the wing 10 toward a submersible 13 in the lower portion of FIG. 8. A faired housing 201 is shown attached to the lower portion of the shaft 121, and a faired housing 201a is shown connected to the upper portion of the shaft 121. The faired housings may be different in size, as illustrated, or they may be of the same size. Complete water and air tightness before, during and after mating of the shaft to the desired hull or the wing must be provided so that personnel may operate all devices from within the faired housings or the shaft, all of which must be sealed at all times from the outside elements. For this purpose the faired housing 201 is capped at its upper end with a flexible collar, not shown, which is disposed around the shaft 121. Such collar excludes water and air and permits relative movement between the shaft 121 and the faired housing 201. The faired housing 201a is provided with a similar collar, not shown.

The shaft 121 in the upper portion of FIG. 8 is attached to a wing 10, partially shown, and the shaft is completely sealed at its lower extremity by the faired housing 201 which surrounds the shaft. The faired housing 201 has a pair of semicircular hatch covers 183 and 193 which provide watertight integrity in the closed position. The semicircular hatch covers are shown in a position which is almost the closed position. Rebate surface 184 on the semicircular hatch cover 193 mates with a similar surface 185 on the semicircular hatch cover 183. A sealing material or device is provided between the surfaces 184 and 185 to insure watertight integrity.

The hatch cover 193 is operated by hydraulic cylinder 180 having concentric piston rods 181 connected at 182 to the semicircular hatch cover 193. The semicircular hatch cover 193 is moved to the right or to the left by controlling the hydraulic fluid supplied to the hydraulic cylinder 180. An access door 190 in the shaft 121 and a door 191 in the faired housing 201 may be provided with similar hydraulic actuating devices. The faired housing 201 is provided with a motor 186, a gear box 187, a shaft 192 and a worm gear 189, connected as shown in the upper portion of FIG. 8. By operating the motor 186 the position of the faired housing with respect to the shaft 121 may be varied up or down, as desired, by changing the direction in which the motor is operated. A square slot 202a in the shaft 121 serves as an acceptance aperture for receiving a locking pin 202 which is shown in FIG. 8a.

The submersible 13 is provided with a hatch 140 with rollers 141 disposed there beneath. A motor 142 drives a shaft 142a which has linkages 143 attached thereto. Attached also to the linkages 143 are the eccentric cams 145. The motor 142 rotates the shaft 142a and the linkages 143, thereby to rotate the eccentric cams 145 into and from the locking position. Pneumatic or liquid compressible gasket 146 is mounted completely around the hatch opening 144, thereby to provide a watertight seal against any water pressures likely to be encountered. The hatch cover 140 is semicircular in shape and closes one-half of the opening 144 in the skin of the submersible 13. A corresponding semicircular portion, not shown, covers the remainder of the opening 144. The two semicircular hatch covers are opened and closed and sealed in a manner similar to the semicircular hatch covers 183 and 193.

Reference is made next to FIG. 8a which shows a plan view of a portion of the submersible 13. one-half of the circular shaft 121 is shown. When the circular shaft 121 in FIG. 8a extends into the hull of the submersible, the semicircular hatch cover 140 is retracted to the right in the position shown. The semicircular hatch cover 140 is connected to a shaft 194 which in turn is connected to a motor 195. The shaft 194 is extensible, and the motor 195 is hydraulically operated. The locking pin 202 shown in FIG. 8a is used to secure the shaft 121 and submersible module 13 firmly and rigidly together as a unit. A drive mechanism for the pin 202 includes a motor 203 and an extensible shaft 204 which slides the pin 202 into position shown through the aperture 202a. The aperture 202a is not shown in FIG. 8a. It is shown in the upper half of FIG. 8. A rotating and bracing device 205 is used to rotate the pin 202. It rotates the pin 202 to the correct angular position so that the square-shaped pin 202 is aligned with the square aperture 202a for insertion. The rotating and bracing device 205 is used additionally to rotate the submersible 13 about its transverse axis. It is desirable to be able to rotate the submersible about a transverse axis for the purpose of inserting additional shafts in other parts of the submersible. For example, if the submersible is down by the stern, the stern may be elevated by the mechanism 205 thereby to bring the stern in engagement with a shaft being inserted thus permitting connection between the submersible and such shaft. It is pointed out that a pair of pins 202 engage apertures 202a on opposite sides of the shaft 121. The pin 202 in the lower portion of FIG. 8a is partially shown, and the associated positioning and rotating mechanism 203 through 205 for such pin are not shown. The upper end of the shaft 121 is provided to pins similar with the pins 202 in FIG. 8a, and such pins in the upper portion of the shaft 121 likewise include mechanisms to extend and rotate them similar to the devices 203 through 205 in FIG. 8a. An additional function of the bracing and rotating device 205 in the submersible and in the wing is to change the angle of either the wing or the submersible with respect to the interconnecting shaft or shafts, as the case may be. By making such angular changes in the wing or the submersibles, flexibility of operation is afforded to the overall arrangement of modules such as illustrated in FIG. 2. This capability is desirable when the modular arrangement in FIG. 2 is airborne, waterborne, submerged, or when changing from one environment to the other.

To attach the shaft 121 in FIG. 8 to the submersible 13 the wing 10 and the submersible 13 are slowed or stopped in the water, and the submersible is maneuvered into a position with the hatch directly below the shaft. Positive buoyancy is placed on the submersible, and the lower faired housing 201 in FIG. 8 tightly engages the submersible. It is then secured to the submersible by an attaching and sealing means, not shown, by personnel within the faired housing or in the submersible. The lower faired housing 201 in FIG. 8 and the submersible 13 are secured with a watertight seal. Then the semicircular hatch covers 183 and 193 are retracted by their associated hydraulic mechanisms. More specifically, the semicircular hatch cover 193 is retracted to the right by operating the motor 180 to withdraw the shafts 181 to the right. The semicircular hatch cover 183 is moved by similar devices to the left. This exposes the shaft 121 to the attached submersible 13. The gasket 146 in the hatch opening of the submersible 13 is decompressed to release water tightness. The motor 142 rotates the actuating device 143 to rotate eccentric cams 145 to release the hatch cover 140. The hydraulic cylinder 195 in FIG. 8a is then actuated to retract the semicircular hatch cover 140, and a similar semicircular hatch cover, not shown, is retracted to the left by similar mechanisms, not shown, as explained above. The motor 186 in FIG. 8 is then operated through the gear box 187, the shaft 192 and the worm gear 189 to lower the shaft 121 into the submersible 13. Once the shaft 121 is lowered to the proper level inside the submersible, the motor 203 in FIG. 8a operates the extensible shaft 204 to insert the locking pin 202 through the aperture 202a of the shaft 121. The aperture 202a is shown in FIG. 8. As the motor 203 drives the locking pin toward the aperture 202a, the rotating and bracing device 205 rotates the locking pin until the pin is aligned with the aperture 202a, at which time it enters the aperture. It is pointed out that the two locking pins 202 in FIG. 8a are inserted. Once inserted, the locking pins may be rotated by their associated rotating and bracing devices, thereby to properly align the submersible 13 and the wing 10. In order to detach the submersible 13 from the shaft 121, a reverse sequence of the above events is performed.

The wing itself is constructed of a basic framework within which interchangeable modules may be utilized. The manner in which the several modules of the wing 10 may be secured to the basic framework is illustrated in FIG. 9. The basic framework of the wing 10 includes members 150 and 151. The frame members 150 and 151 may be I-beams, for example. A detachable module is illustrated as having side members 152 and 153 disposed on a bottom or base member 154. Suitable brackets 155 and 156 are secured by suitable means, not shown, to the basic frame members 150 and 151. A plurality of such bracket members 155 and 156 are disposed at suitable intervals beneath the detachable module to basic frame members, not shown in FIG. 9. A plurality of spacers 159 are disposed at the right of the detachable module, and each is provided with a locking bolt and nut 160. A nut and bolt 161 is provided to secure the left side of the module to the bracket 155. The detachable module is shown with a bottom and two sides, but it is understood that two end members and a top or overhead member may be provided, as needed or desired. In this connection it is pointed out that multiple modules disposed adjacent to each other do not need individual sides for each such module. In like fashion if modules are disposed one over the other, each does not need an overhead member since the bottom of the top module may serve as the overhead member of the lower module. However, in some cases it may be desirable to provide a bottom, a top and four sides for each module, particularly where watertight integrity is a major concern. Additionally, full or partial framing only may be provided for the modules, as required to permit performance of their functions. The dimensions of each module may be varied from a few feet to many yards, depending upon the function performed by the module.

It will be understood from the foregoing that the invention provides a novel modular construction and configuration of a vessel suitable for transporting, launching, landing, and/or maintaining aircraft on or below the surface of the water or in the air. The wing, if made large enough, can carry some aircraft in the air and can even permit landing and launching of such while in motion. Also, by means of the elevator construction and suitable hatches, not shown, smaller aircraft, such as fighter planes, helicopters and even small bombers, can be lowered into the surface or submersible vessels for safe carriage in case of enemy action.

The assembly provides novel modular construction which is relatively easy to manufacture, assembly, repair and overhaul. Components can be replaced or changed for functional use and can be assembled at sea or disassembled to suit tactical defense or offense operations.

Because of the modular construction, various components can be replaced and repaired without requiring that the whole assembly be laid up. The modules to be overhauled or otherwise replaced may be substituted for in a short time by new or similar and spare modules. Units may be replaced while the assembly is underway at sea. The whole purpose of the vessel may be changed by substitution of different components without affecting the rest of the assembly.

While particular descriptions have been given of an aircraft carrier and its functions, it will be understood that the units may be assembled to provide primarily a bulk cargo carrier, a carrier for containers, a carrier for liquids, a carrier for passengers, or even for compressed cargo gas, or a recovery vessel for spacecraft. The unit may be made small in size, providing for storage, maintenance, launching and recovery facilities of limited numbers of aircrafts, or it may be large for replacing the largest of conventional aircraft carriers.

The unit is obviously useful as a troop carrier, providing novel means for loading and unloading during amphibious warfare operations.

When the vessel or assembly is made large, it is capable of operating independently of the heavy drag and frictional inefficiencies caused by rough water surfaces and deep draft. At the same time, the unit, by separation into components, is capable of escape and concealment from offensive surface action, by use of high surface speed, submersion of some components and/or flight of other components or of the assembled vessel. It is capable of passage beneath surface ice. With sufficient power, it is capable of operation in all these environments as an assembled vessel. While the wing is capable of independent operation through use of auxiliary, integral power plants, more efficient operation may be derived currently from use of nuclear power plants embodied in one or more attached submersibles. Moreover, a distinct additional advantage is obtained from the lift imparted to the assembled vessel by the wing configuration of the flying unit during high-speed operations.

The various components can be repaired at sea or certain individual ones of them can be taken to land base and replaced, as indicated above, so that the vessel can be substantially continuously in operation.

The wing 10 is generally configured as an airfoil, having all the essential and appropriate flying control surfaces such as rudders, elevators, ailerons, etc., for pitch, roll and yaw.

The submersible units may be of bubble module type, as shown in FIGS. 5 and 6, or may be more conventional. The use of elevator modules within the wing, shafts and/or in other modules for raising and lowering aircraft, missiles, personnel and cargoes from the submersible vessels to the wing or within the wing itself will be obvious to those skilled in the art.

Several lower decks in addition to those already mentioned may be provided in the wing unit 10 to store, maintain, arm and fuel aircraft, and to permit the vessel to operate as an habitable entity, more or less. Substantial cargo storage is provided and the necessary means for catapulting aircraft in the case of takeoff from the wing surface and/or from internal compartments will be provided. The catapult devices may be removed from the wing to the surface of submersible vessels to reduce the weight of the flying unit, if this is found to be desirable.

It will be understood also that suitable air and/or ballast tanks will be provided, as well as means for venting, heating, air conditioning, etc. Means by which the vertical supporting shafts are connected to the several components will be obvious to those skilled in the art and various modifications are contemplated. Ordinarily they will be of the quick disconnecting type for ease of modular assembly and disassembly.

Auxiliary power plants 43, 44 may be provided for both surface and air travel or for either. Fuel tanks will be provided for air travel and fuel transfer, as well as for fuel transfer to the surface and submersible vessels. Ramps may be provided for movement of aircraft between decks, as well as for other cargo. The necessary locks and vents for controlling precluding or eliminating entry of gases, air, water, or other materials, will be obvious to those skilled in the art.

The skin and frame in sections adapted to modular construction will be designed to take care of metal expansion; since the units are much smaller, or most of them, then conventional vessels, much less difficulty will be encountered in this respect.

Retractable barriers 99, FIGS. 1 and 4, may be provided to control and stabilize the flow of air over each elevator for landing aircraft. Arresting gear may be provided as needed for landing aircraft on the deck, as will be understood by those skilled in the art. Conveyors for lifting aircraft or for moving them on and around the wing will be provided.

Changing submersible draft and/or length of vertical shafts varies the height of the flight deck to suit operating conditions when surfaced, particularly to preclude waves interfering with aircraft landings and launchings.

Modules may be either self-enclosed or they may be designed and assembled at sea by addition of temporary walls to existing units, providing suitable gaskets and seals to exclude water while the vessel is being submerged or during assembly or disassembly of upper section members or extension of the shafts by which they are attached.

The wing and the submersible elements may be provided with various outrigger types of buoyancy devices to aid in control of draft at slow speeds or while stopped. These modules may be designed so as either to be fixed or extendable. That is, they may be retractable and otherwise variable or flexible to control air, water and other elements. They should retract to preclude streamlining interference or to present a desired surface to provide good aerodynamic design.

In lieu of the auger-type extending device for the shafts, continuous chain-type extenders or controllers may be provided. These may be designed to have sufficient cross-sectional area for single or multiple lift types, supplied both to the horizontal shafts, as well as to those which extend upwardly. Means may be provided for supporting the whole assembly under water, in the case of shallow water. These may be extendable in the same manner as the shafts already described.

It will be understood that the above and other modifications may be made by those skilled in the art without departing from the principles and spirit of the invention. It is intended by the claims which follow to cover all such, as far as the prior art properly permits.

I claim:

1. A wing member capable of flight per se comprising a large generally flat upper surface member capable of receiving and launching aircraft:

attachment means for attaching to said wing member at least one seagoing vessel to form in combination a rigid seaworthy craft; and said attachment means including mechanical means for extending and retracting at least one shaft for attachment of the seagoing vessel to the wing member, and means for providing watertight connections at the ends of each such shaft.

2. The apparatus of claim 1 wherein a faired housing is provided on at least one end of each shaft.

3. The apparatus of claim 2 including means to vary the position of the faired housing with respect to the shaft.

4. The apparatus of claim 1 wherein the seagoing vessel includes a hull, said hull having a lower portion which is recessed to form a chamber capable of retaining a gas therein, said gas serving to reduce friction between said hull and the sea water by providing a cushioned barrier and said gas further serving to increase the buoyancy of said seagoing vessel.

5. A wing member capable of flight per se comprising a generally flat upper surface member capable of receiving and launching aircraft, said wing member including a base frame in which a plurality of modular units are detachably secured:
at least one submersible module detachable secured to said wing member, a hollow watertight shaft connecting said wing member to each such submersible module, thereby to permit the transfer of material and personnel between the wing member and each such submersible module; and
each hollow watertight shaft including means provided on each end thereof for changing the angle of the longitudinal axis of the wing member with respect to such shaft or for changing the angle of the longitudinal axis of each submersible module with respect to such shaft.

6. The apparatus of claim 5 wherein a faired housing is provided on at least one end of each shaft.

7. The apparatus of claim 6 including means to vary the position of the faired housing with respect to the shaft.

8. The apparatus of claim 5 wherein at least one submersible module includes a hull having a lower portion which is recessed to form a chamber capable of retaining a gas therein, said gas serving to reduce friction between said hull and the sea water by providing a cushioned barrier, and said gas serving further to increase the buoyance of said submersible module.

9. A seagoing craft capable of operation on the sea surface comprising in combination a wing member, a plurality of submersible modules, a plurality of shafts, each submersible module being detachably connected by one or more of said shafts to said wing member:
said wing member including a base frame in which a plurality of modular units are detachably secured therein, one or more said modular units in said wing provide storage, maintenance, service and other support facilities for aircraft, and one or more of said modular units in said wing providing accommodations for personnel and storage for supplies; and
means provided on each end of each shaft for changing the angle of the longitudinal axis of the wing with respect to said shaft or for changing the angle of the longitudinal axis of the submersible module with respect to said shaft.

10. The apparatus of claim 9 wherein a faired housing is provided on at least one end of each shaft.

11. The apparatus of claim 10 including means to vary the position of the faired housing with respect to the shaft.

12. The apparatus of claim 9 wherein at least one of said submersible modules includes a hull having a lower portion which is recessed to form a chamber capable of retaining a gas therein, said gas serving to reduce friction between said hull and the sea water by providing a cushioned barrier, and said gas serving further to increase the buoyancy of said submersible module.

13. A seagoing heavier-than-aircraft capable of carrying personnel, cargo, equipment or stores, said seagoing heavier-than-aircraft being capable of operation on the surface of the sea, under the surface of the sea, and flight in air, said seagoing heavier-than-aircraft comprising in combination:
a wing member, a plurality of submersible modules, a plurality of extensible shafts, each submersible module being detachably connected by one or more of said extensible shafts to said wing member; and
means for providing watertight connections at the ends of each such shaft.

14. The apparatus of claim 13 wherein a faired housing is provided on at least one end of each shaft.

15. The apparatus of claim 14 including means to vary the position of the faired housing with respect to the shaft.

16. The apparatus of claim 14 which includes power-operable means for extending and contracting said shafts.

17. The combination according to claim 14 which comprises power operable means for locking and unlocking said modules together.

18. The combination according to claim 14 which comprises a motor-driven screw for extending and retracting said shafts.

19. The combination according to claim 14 which further includes a separable floating fuel tank module, an additional shaft, said additional shaft securing said tank modules to said wing member.

20. The combination including:
a wing member capable of flight per se, a plurality of submersible modules, a plurality of shafts, each submersible module being detachably connected by one or more of said shafts to said wing member;
said wing member, said plurality of submersible modules, and said plurality of shafts connecting said submersible modules to said wing member forming in combination a craft which may operate as a heavier-than-aircraft in the air, operate on the surface of the sea, or operate beneath the surface of the sea as an integral assembly, said wing member being able to launch and receive aircraft or the like when the integral assembly operates in the air and on the surface of the sea; and
means for providing watertight connections at the ends of each of said shafts thereby to maintain watertight integrity on the surface of the sea and below the surface of the sea and airtight integrity in the air.

21. The apparatus of claim 20 wherein said wing member includes a base frame in which a plurality of modular units are detachably secured therein, one or more of said modular units in said wing providing storage, maintenance, service and other support facilities for aircraft, and one or more of said modular units in said wing providing accommodations for personnel and storage for supplies.

22. The apparatus of claim 21 wherein said modular units are disposed vertically to form compartments in said wing member, one of said compartments having an opening through the bow of said wing member, a catapult disposed in said compartment in alignment with the opening through the bow, and said catapult including means to launch aircraft and the like horizontally through said opening in the bow of said wing member.

23. The apparatus of claim 20 further including means on each end of each shaft for changing the angle of the longitudinal axis of the wing member with respect to said shaft or for changing the angle of the longitudinal axis of the submersible module with respect to said shaft.

24. The apparatus of claim 20 wherein a faired housing is provided on at least one end of each shaft.

25. The apparatus of claim 24 including means to vary the position of the faired housing with respect to the shaft.

26. The apparatus of claim 20 wherein the wing member has an upper surface on which is disposed at least one retractable air barrier for controlling the velocity of air along the upper surface of said wing member whereby objects on the upper surface of the wing member are protected from high velocity winds during takeoff and during landing operations after touchdown of the landing craft.

27. The apparatus of claim 20 wherein said wing member has an upper surface, an elevator shaft extending from the upper surface down toward the interior, an elevator disposed in said elevator shaft, a catapult disposed on said elevator, and said catapult including means to launch an aircraft or the like from the wing member.

28. A craft comprising a wing member capable of flight per se which is able to launch and receive aircraft and the like, at least one seagoing vessel, attachment means for attaching to said wing member such seagoing vessel to form in combination a rigid seaworthy craft:

said attachment means including mechanical means for extending and retracting one shaft for attachment of the seagoing vessel to the wing member, means for providing watertight connections at the ends of each such shaft;

a power plant disposed in at least one seagoing vessel; and a power plant disposed in said wing member which provides thrust and therefore lift to reduce draft and drag when the rigid seaworthy craft operates on the sea surface.

29. The apparatus of claim 28 wherein at least one seagoing vessel has a lower surface a portion of which is concave, and said concave portion being capable of retaining a gas which:
1. increases the buoyancy of said seagoing vessel; and
2. reduces the drag of said seagoing vessel by forming a cushioned barrier between the seagoing vessel and the sea.

30. A seagoing craft capable of flight in air, under sea operation, and sea surface operation comprising in combination:

a wing member, a plurality of submersible modules, a plurality of hollow shafts, each submersible module being detachably connected by one or more of said hollow shafts to said wing member; and means for providing watertight connections at the ends of each of said hollow shafts whereby material and personnel may be exchanged between said wing member and said submersible modules.

31. The apparatus of claim 30 wherein a faired housing is provided on at least one end of each shaft.

32. The apparatus of claim 30 including means to vary the position of the faired housing with respect to the shaft.

33. The apparatus of claim 30 wherein at least one of said plurality of submersible modules includes a hull having a lower portion which is recessed to form a chamber capable of retaining a gas therein, said gas serving to reduce friction between the hull and the sea water by providing a cushioned barrier and said gas further serving to increase the buoyancy of such submersible module.

34. The apparatus of claim 30 wherein said wing member includes a base frame in which a plurality of modular units are detachable secured therein, one or more of said modular units in said wing providing storage, maintenance, service and other support facilities for aircraft, and one or more of said modular units in said wing member provide accommodations for personnel and storage for supplies.

35. The apparatus of claim 34 wherein the wing member has an upper surface on which is disposed at least one retractable air barrier for controlling the velocity of air along the upper surface of said wing member whereby objects on the upper surface of the wing member are protected from high velocity winds during takeoff and during landing operations after touchdown of the landing craft.

36. The apparatus of claim 34 wherein said wing member has an upper surface, an elevator shaft extending from the upper surface down toward the interior, an elevator disposed in said elevator shaft, a catapult disposed on said elevator, and said catapult including means to launch an aircraft or the like from the wing member.

37. The apparatus of claim 34 wherein said modular units are disposed vertically to form compartments in said wing member, one of said compartments having an opening through the bow of said wing member, a catapult disposed in said compartment in alignment with the opening through the bow, and said catapult including means to launch aircraft and the like horizontally through said opening in the bow of said wing member.

38. The apparatus of claim 30 further including means on each end of each shaft for changing the angle of the longitudinal axis of the wing member with respect to said shaft or for changing the angle of the longitudinal axis of the submersible module with respect to said shaft.

39. The apparatus of claim 30 wherein at least one of said plurality of submersible modules includes a power plant for propelling the seagoing craft in water, and said wing member includes a power plant, and the power plant is operated to provide thrust and therefore lift to the ring member which reduces the draft and hence the drag of the seagoing craft.

40. The apparatus of claim 30 wherein at least one of the plurality of submersible modules includes a hull having a lower portion which is recessed to form a chamber capable of retaining a gas therein, said gas serving to reduce friction between said hull and the sea water by providing a cushioned barrier and said gas further serving to increase the buoyancy of such submersible module.